April 12, 1966 W. DEGEN 3,245,223
METHOD OF SOIL COMPACTION
Filed Sept. 7, 1960 3 Sheets-Sheet 3

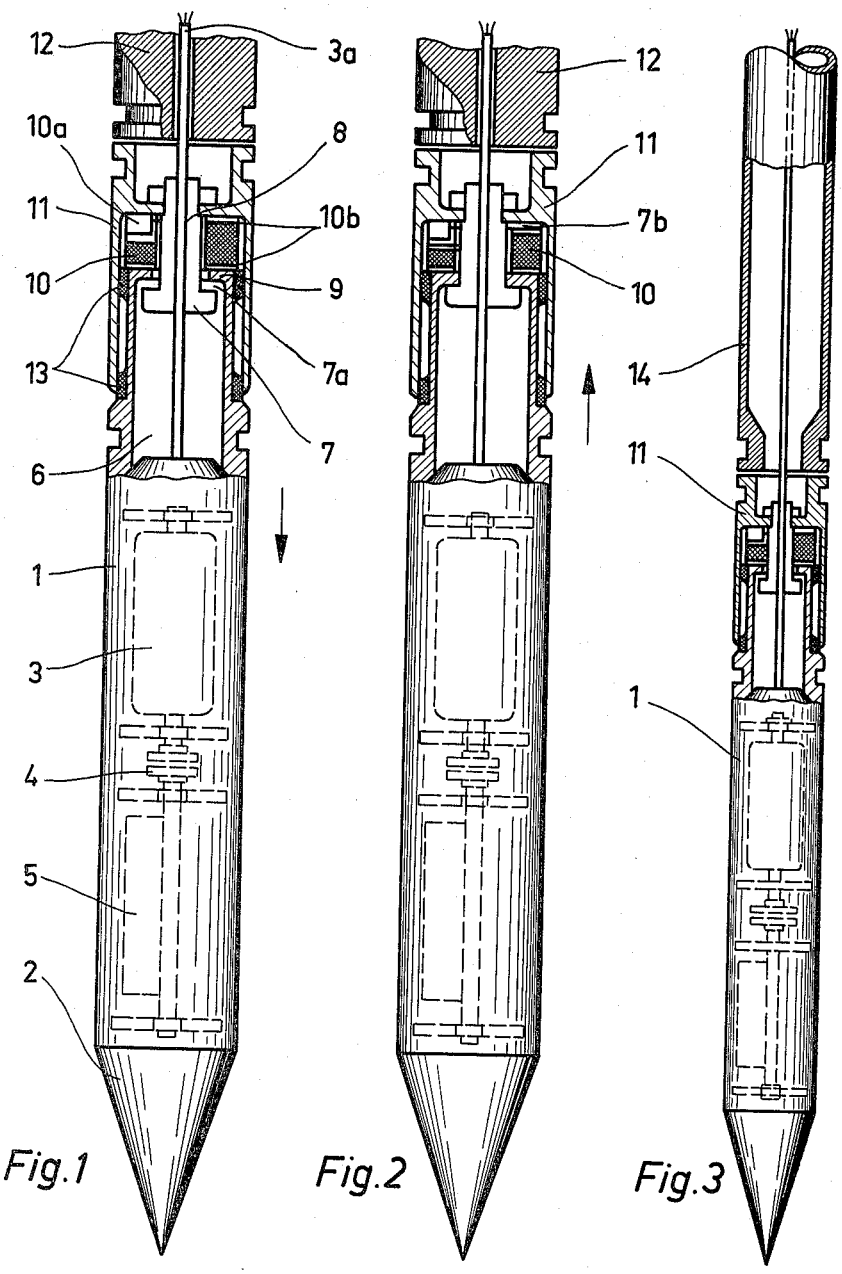

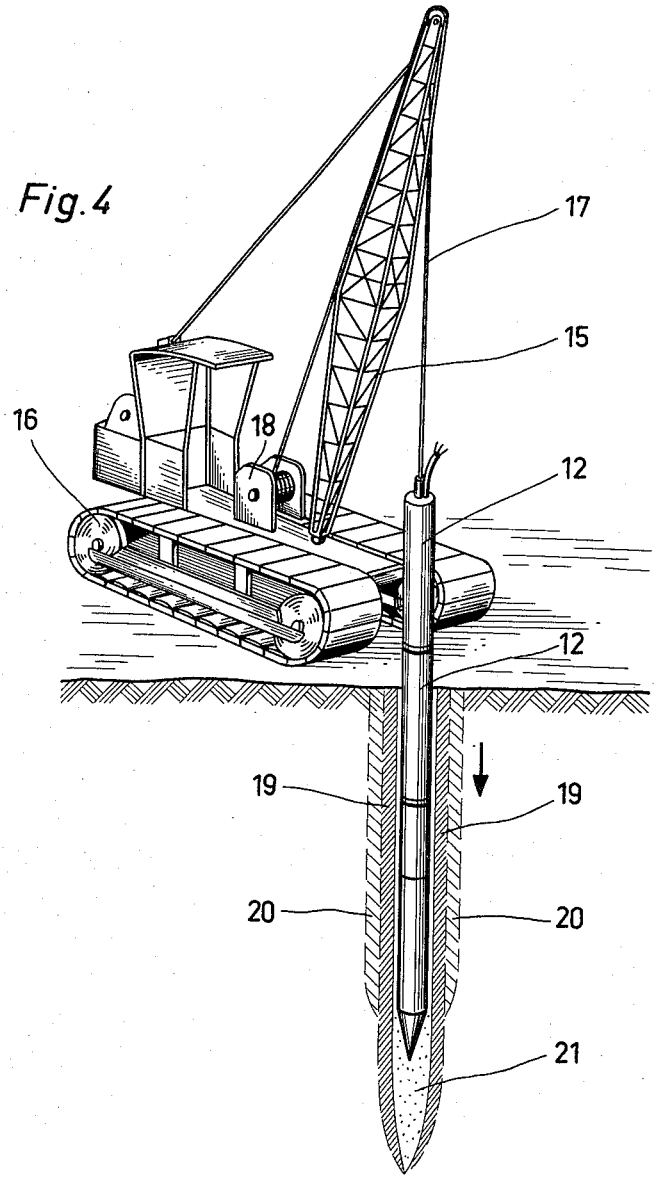

INVENTOR
WILHELM DEGEN
BY [signature]
AGENT

3,245,223
METHOD OF SOIL COMPACTION
Wilhelm Degen, Zeppenallee 29, Frankfurt am Main, Germany
Filed Sept. 7, 1960, Ser. No. 54,434
4 Claims. (Cl. 61—36)

The present invention relates to a method and device for compacting soils, particularly for compacting coherent soils by means of an internal vibrator brought down to the necessary compacting depth even into soils so firm that they could heretofore not be penetrated by means of internal vibrators by the dry method, that is, without the use of an auxiliary liquid. The descending internal vibrator produces compacted firm columns of soil useful as foundations for building of all kinds.

The invention provides a soil immersion vibrator having a downwardly directed point of a length greater than the diameter of the vibrator and suspended from rods or tubes of the same diameter as the body of the vibrator. When the vibrator rotates at about 3000 revolutions per minute, the ratio between the lateral striking force in tons to the section of the vibratory body in dcm$^2$ is greater than 1.5. The vibrator is coupled by an oscillation damping connector to a source of supplemental vertical pressure while it is being lowered into the soil and is brought to the necessary compacting depth, whereafter the vibrator is lifted from the hole formed which is again filled with soil masses into which the vibrator is immersed. The cycle of lowering the vibrator, lifting the vibrator, and filling the hole is repeated until the vibrator cannot penetrate into the soil anymore.

The vibrator of the invention can penerate firm coherent soils to form a hole without the use of a liquid for converting the soil to a slip or slurry.

It is a further advantage of the invention that it does not require hardening agents be introduced into the wall of the hole in order to solidify it.

In the cited types of soil, the method of the invention produces a column-shaped zone of compacted soil which may extend a depth of twenty meters and is capable of carrying buildings.

It is a further advantage of the invention that the walls of the hole cannot collapse above the vibrator due to oscillations propagated in the soil.

Other objects, features and advantages of the invention will be pointed out in the following detailed description of preferred embodiments relating to the appended drawing in which:

FIGURE 1 shows a vibrator of the invention with coupling and supplemental weight in elevational section;

FIGURE 2 shows the vibrator of FIG. 1 in a different operative position;

FIGURE 3 shows another vibrator arrangement;

FIGURE 4 shows the vibrator with supplemental weight suspended from a track-laying vehicle, the view being in perspective and partly in section.

Figure 5:
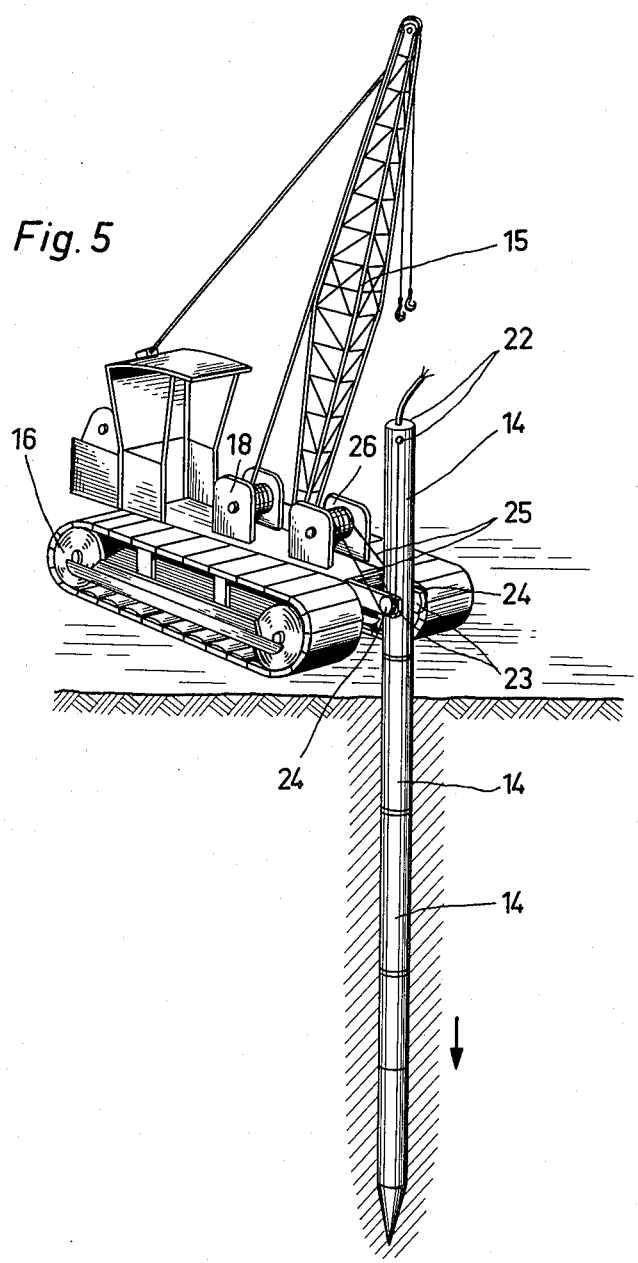
FIGURE 5 shows the apparatus of FIG. 4 in a different operative condition.

FIGURE 1 shows a vibrator of the invention with the lower end of the suspending structure. The vibrator comprises a cylindrical casing 1 the bottom of which is closed by a coaxial conical cap 2. The axial length of the cap 2 is greater than the diameter of the vibrator casing 1. A motor 3 receiving electric current through a flexible cable 3a, and an eccentrically gyrating mass 5 connected to the output shaft of the motor by a coupling 4 are mounted within the vibrator casing 1 in a known manner. When the eccentrically mounted mass is rotated by the motor, the vibrator performs an oscillatory movement transverse to its axis which is transmitted to the surrounding soil. The amplitude of oscillation may amount to 0.5 inch. In order not to transmit these oscillations to the rods from which the vibrator is suspended and which have the same diameter as the said vibrator there is provided according to the invention, a coupling which reduces the transmission of oscillations to a minimum. For this purpose the supplemental weight 12 has a stud 8 with head 7 which may be of disk- or arc-shaped configuration. Between the upper vibrator flange 9 and a coaxial tubular element 11 which projects from the lower edge of the weight 12, an oscillation dampening connector 10 which has the shape of an annular disk with cams 10a is inserted to absorb torsion stresses. The stud 8 with the head 7 extends through the connector 10 which is a rubber element faced with metal disks 10b. The stud 8 also extends through the vibrator flange 9, which covers the space 6 in the vibrator casing 1 in such a manner that the head 7 of the stud 8 can be arranged within it. This connection between the vibrator and the supplemental weight is surrounded in a telescopic manner by tubular element 11 which is screwed firmly to the supplemental weight 12.

During lowering of the vibrator 1 the load of the weight 12 and of the other rods not visible in FIGS. 1 and 2, is applied to the vibrator 1 only through the connector 10 while the vibrator oscillations are absorbed within the rubber of the connector 10. The stud 8 is of such length that, with the vibrator put on the soil or immersed therein, the head 7 extends freely into the space 6, and the upper vibrator flange 9 and the head 7, are separated by a gap 7a.

Because of the presence of interposed rings 13, the tubular element 11 secures the vibrator casing against lateral bending so that the vibrator cannot take an oblique course within the soil.

FIGURE 2 shows the same vibrator with supplemental weight during lifting of the device. The connector 10 is released from the weight 12, and therefore from the rods, so that the gap 7a (FIGURE 1) closes and a gap 7b is formed between the connector 10 and a radial face of the element 11. The vibrator hangs freely from the head of the stud 8 whereby almost no oscillations are transmitted upwardly.

FIGURE 3 shows a vibrator of the same type as in FIGS. 1 and 2, the rods are replaced by tubes 14 of the same diameter as the vibrator and connected with the upper part of the element 11. The tubes 14 are connected to the vibrator 1 by means of the same coupling as described in FIGURES 1 and 2.

FIGURES 4 and 5 illustrate the operation of the vibrators of the invention.

The vibrator is suspended by a rope 17 from a boom 15 mounted on a track-laying vehicle 16 and is lowered by means of a winch 18. It penetrates the soil when the vibrator motor is running, whereby the soil is laterally displaced first by the point of the vibrator, and thereafter by the vibrator casing itself, and is compacted in zones 19 and 20 about the hole formed. The compacted soil is held in position and prevented from entering the opening formed in the soil by the tubes 14. The necessary lateral striking force is provided by the motor 3, and a downward force is exerted by a string of rods or supplemental weights 12 which also serve as the vibrator suspension and which do not oscillate transversely because they are connected to the vibrator by the afore-described coupling. The lateral striking power of the vibrator is concentrated on the soil walls axially coextensive with the vibrator.

Because of the tapering configuration of the vibrator point 2, the soil is not compacted ahead of the vibrator during lowering so that the vibrator does not block its own path.

The vibrator with the supplemental weight is lowered to the desired depth and is lifted thereafter from the hole formed. The hole is filled with additional soil 21 and the vibrator is lowered again. This process may be repeated as many times as necessary until either a hole with firm compacted wall zones 19, 20 has been formed or until the initially formed hole is filled to the surface with compacted soil and the vibrator can no longer penetrate into the highly compacted soil. The depth of the compacted soil may be 20 meters and more in firm coherent soils and is limited by the combined length of the vibrator and its supporting rods.

It is particularly advantageous to use the arrangement shown in FIG. 5 in which the weight of the track-laying vehicle is used for exerting a vertical downward force on the vibrator. The track-laying vehicle has a fork-shaped arm 23 carrying two pulleys 24 over which two ropes 25 are guided from fastenings 22 on the outermost tube 14 above the arm 24 to a winch 26. When the winch 26 pulls the ropes 25, the weight of the track-laying vehicle counteracts the resistance of the soil penetration by the vibrator.

The apparatus shown in FIG. 5 is operated in the same manner as described with reference to FIG. 4, but tilting of the vibrator is avoided, and handling of the relatively long device, particularly when transporting the device from one soil compacting spot to another, is facilitated. Because of the supplemental loading of the vibrator by ropes 25, the tubes 14 which transmit downward motion from the traction ropes 25 to the vibrator may be relatively light.

Immersion vibrators with rotating unbalanced masses for compacting soil are known per se but they normally can penerate into the soil under their own weight only in the case of sandy soils which are transformed into a slurry liquid. The rods on which they are suspended are under stress only while the vibrator is being lifted, so that the connector interposed between the vibrator and the suspension unit is stressed in tension only.

The vibrator described, for example, in Patent No. 2,229,912 may penetrate to a shallow depth in soft soils. It is not able to penetrate into coherent firm soils to depths of 20 and more yards, even if the bore hole walls of a hole made with such a vibrator would not collapse. Such collapsing could not be prevented by injection of solidification agents because the walls could not harden quickly enough.

I claim:
1. A method of compacting coherent soil which comprises:
   (a) embedding a downwardly tapering vibrator member in a portion of the soil to be compacted;
   (b) horizontally oscillating said embedded member;
   (c) urging said member, while oscillating, in a downward direction with a force sufficient for moving the same downward in said soil, and for thereby forming a vertically elongated opening in said soil, whereby soil is compacted about said opening and prevented from entering said opening until said member has moved to a predetermined depth under said force;
   (d) upwardly withdrawing said member from the soil through said opening;
   (e) filling said opening with an uncompacted body of soil;
   (f) embedding said member in said body;
   (g) horizontally oscillating said member while embedded in said body; and
   (h) urging said member, while oscillating and embedded in said body, in a downward direction with a force sufficient for moving said member downward in said body.

2. A method as set forth in claim 1, wherein downward traction is applied to motion transmitting means, and said traction is transmitted by said motion transmitting means as said downward force to said vibrator member.

3. A method as set forth in claim 2, which further comprises preventing transmission of oscillating movement from said vibrator member to said motion transmitting means.

4. A method as set forth in claim 2, wherein said downward traction is applied to said motion transmitting means above said soil.

References Cited by the Examiner
UNITED STATES PATENTS

| | | | |
|---|---|---|---|
| 935,081 | 9/1909 | Wolfsholz | 61—36 |
| 1,906,706 | 5/1933 | Moore | 175—21 |
| 2,667,749 | 2/1954 | Steuerman | 61—36 |
| 2,718,761 | 9/1955 | Steuerman | 61—36 |
| 2,951,681 | 9/1960 | Degen | 175—21 X |
| 2,990,022 | 6/1961 | Muller et al. | 173—49 |
| 3,008,528 | 11/1961 | Berthet et al. | 173—49 |

FOREIGN PATENTS

| | | |
|---|---|---|
| 519,802 | 5/1953 | Belgium. |
| 602,057 | 12/1925 | France. |

CHARLES E. O'CONNELL, *Primary Examiner.*

JACOB L. NACKENOFF, JACOB SHAPIRO, EARL J. WITMER, *Examiners.*